US007185382B2

(12) United States Patent  
Hutton

(10) Patent No.: US 7,185,382 B2  
(45) Date of Patent: Mar. 6, 2007

(54) AIRPORT BAGGAGE LIFT SYSTEM

(75) Inventor: Neil Hutton, Ottawa (CA)

(73) Assignee: DEW Engineering and Development Limited, Ottawa (CA)

(*) Notice: Subject to any disclaimer, the term of this patent is extended or adjusted under 35 U.S.C. 154(b) by 588 days.

(21) Appl. No.: 10/758,218

(22) Filed: Jan. 16, 2004

(65) Prior Publication Data

US 2005/0158157 A1    Jul. 21, 2005

(51) Int. Cl.
  *E01D 22/00*   (2006.01)
(52) U.S. Cl. ...................................... 14/71.5
(58) Field of Classification Search ......... 14/69.5–71.5
  See application file for complete search history.

(56) References Cited

U.S. PATENT DOCUMENTS

| 5,084,936 A * | 2/1992 | Thomas, Jr. ................. 14/71.5 |
| 6,658,685 B1 * | 12/2003 | Ratliff et al. ................ 14/71.5 |
| 6,676,359 B2 * | 1/2004 | Ganiere ....................... 414/391 |
| 2003/0178259 A1 | 9/2003 | Henderson |

OTHER PUBLICATIONS

DEW Valet Baggage Systems brochure, DEW Engineering and Development Limited, Jan. 2001.
JB Aviation website (www.jandbaviation.com), Jun. 13, 2003.

* cited by examiner

*Primary Examiner*—Raymond Addie
(74) *Attorney, Agent, or Firm*—Freedman & Associates

(57) ABSTRACT

A baggage handling unit for retrofitting an existing passenger boarding bridge having a foundation includes a walkway for coupling a terminal building access port and a rotunda of an existing passenger boarding bridge so as to support passenger movement therebetween. The walkway includes a baggage access port, and a baggage elevating element is mounted adjacent to the baggage access port of the walkway. The baggage handling unit also includes a support having a mounting end configured for engaging the foundation and a support end for supporting the rotunda of the existing passenger boarding bridge at a position that is horizontally displaced from the foundation. A mount is provided for fixedly coupling the baggage handling unit to the rotunda about a point opposite an aircraft engaging portion of the existing passenger boarding bridge, such that the baggage handling unit and the rotunda are structurally attached.

26 Claims, 13 Drawing Sheets

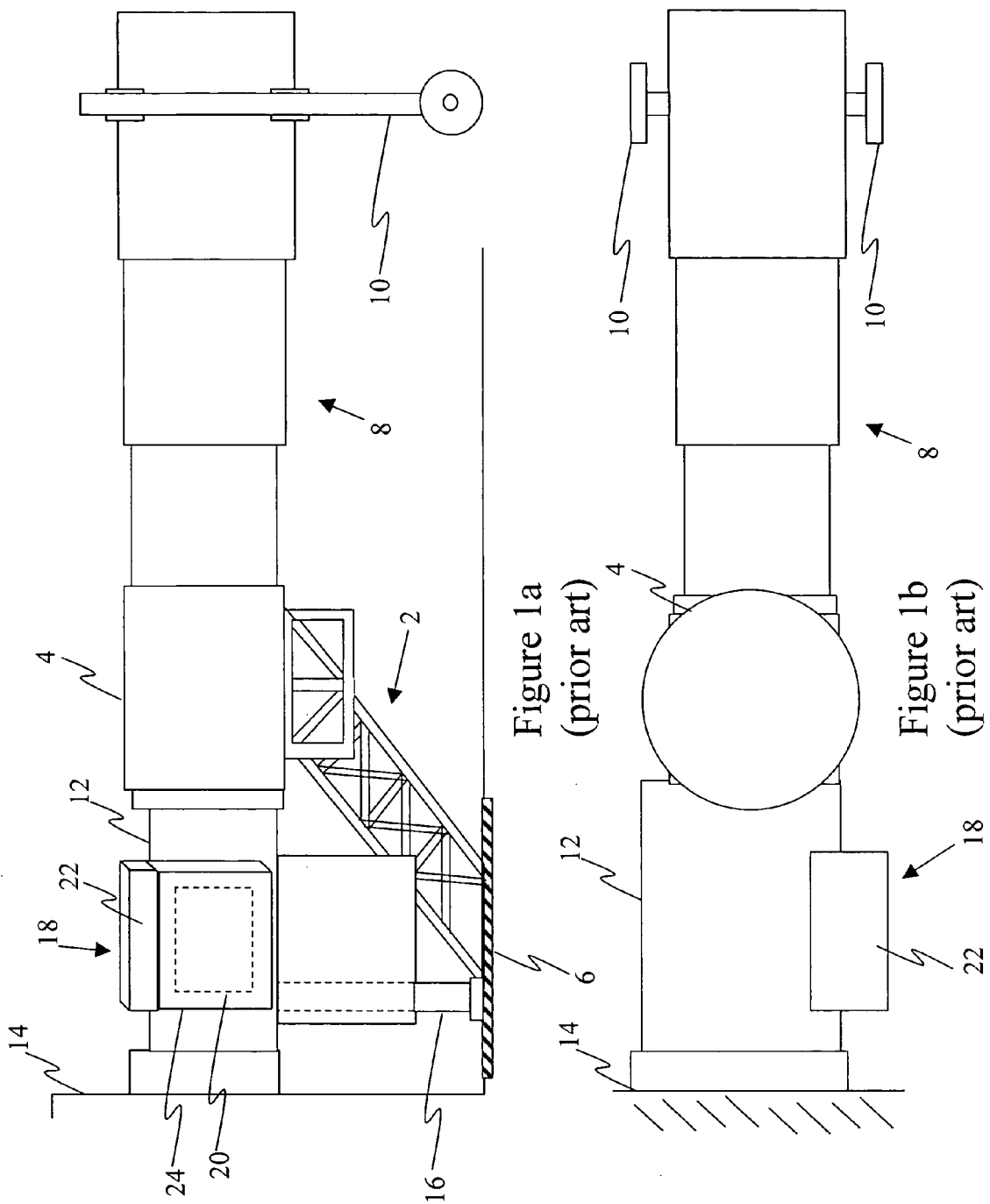

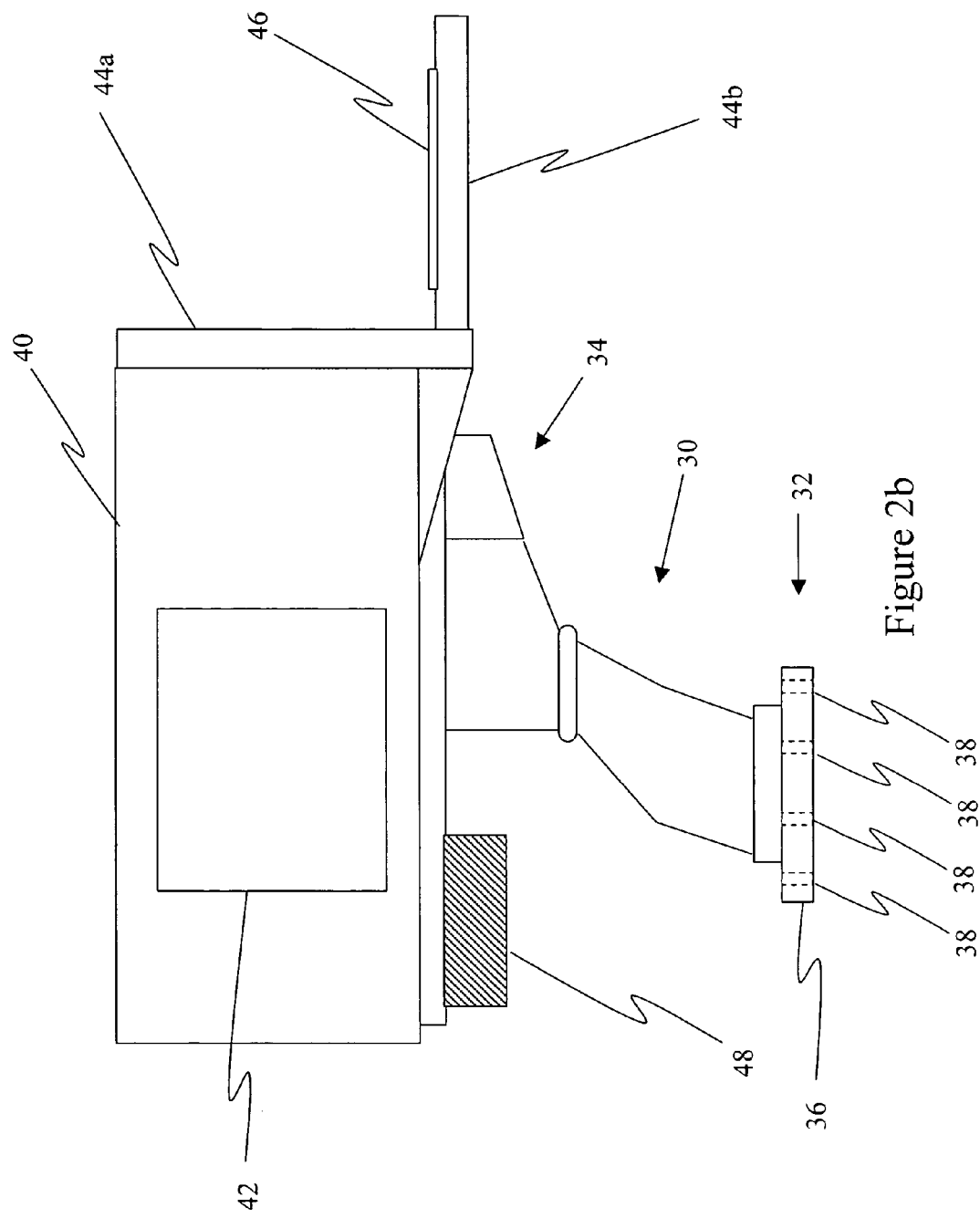

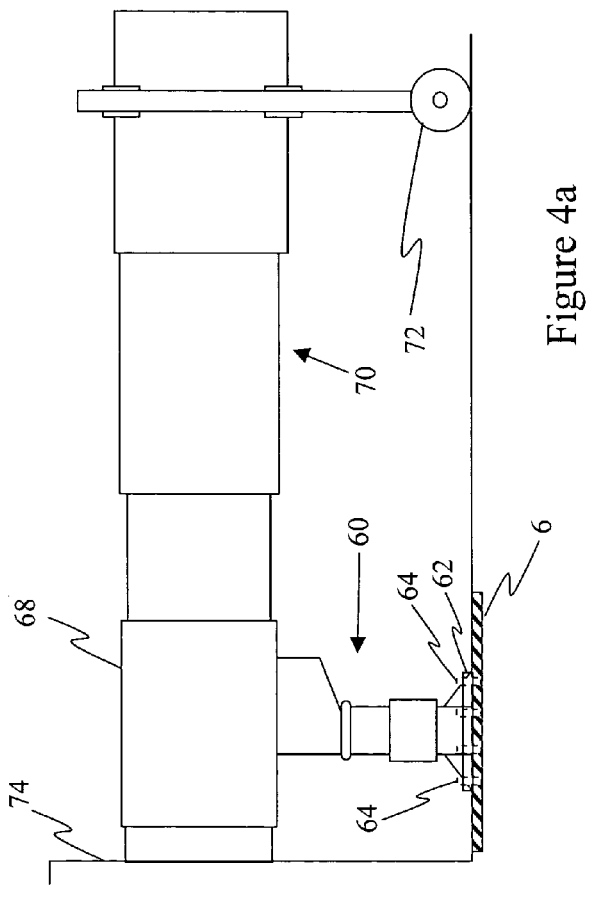
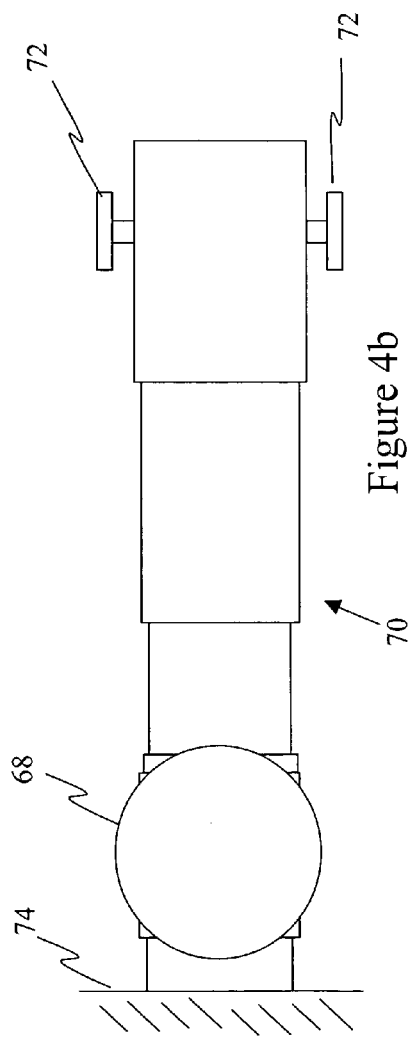
Figure 4a
Figure 4b

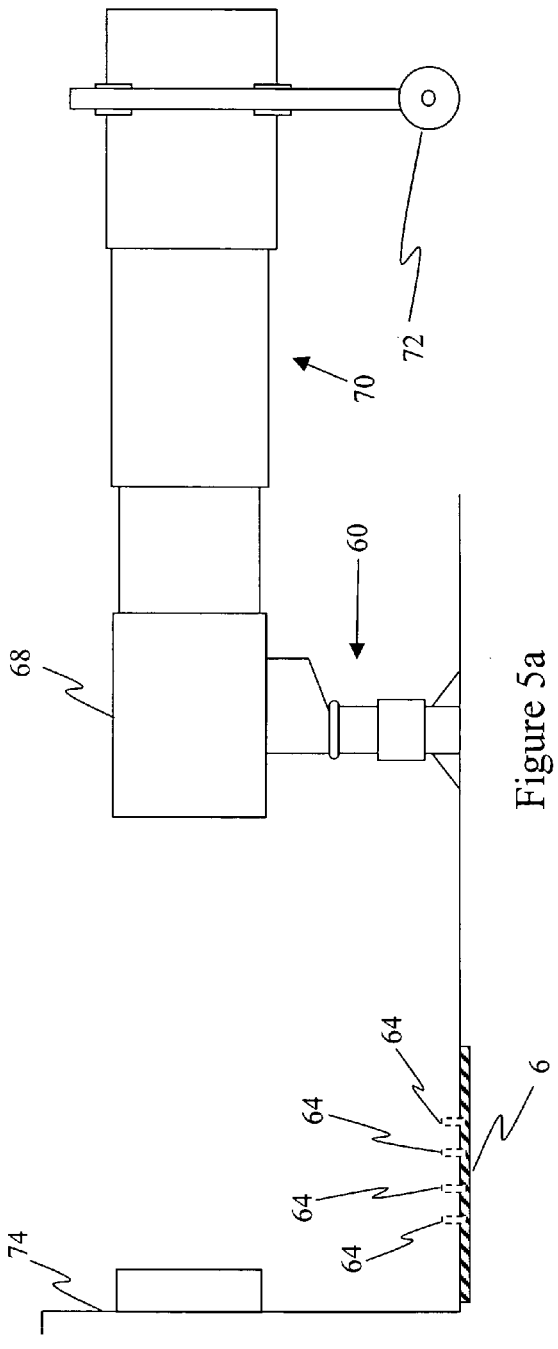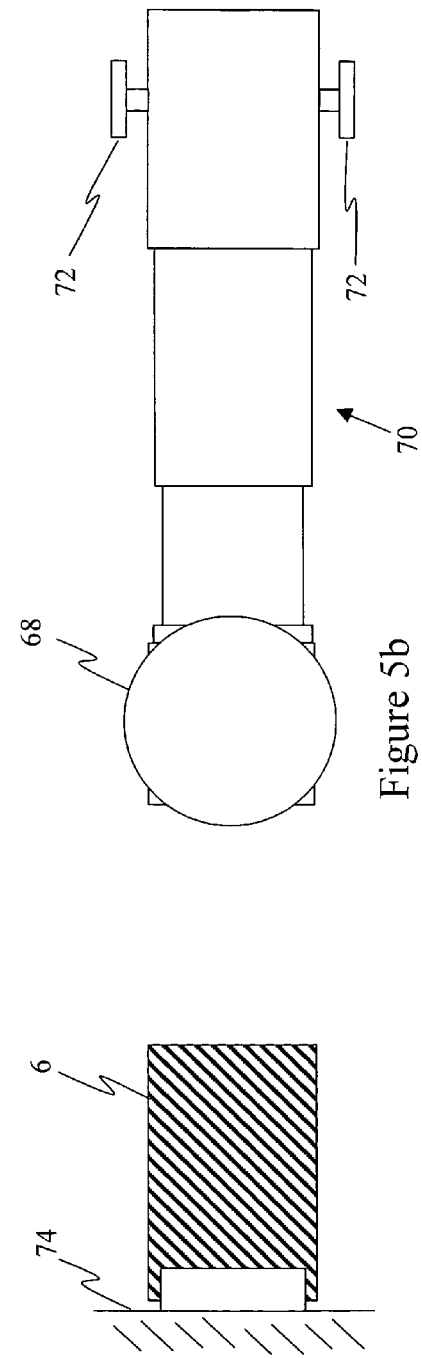
Figure 5a
Figure 5b

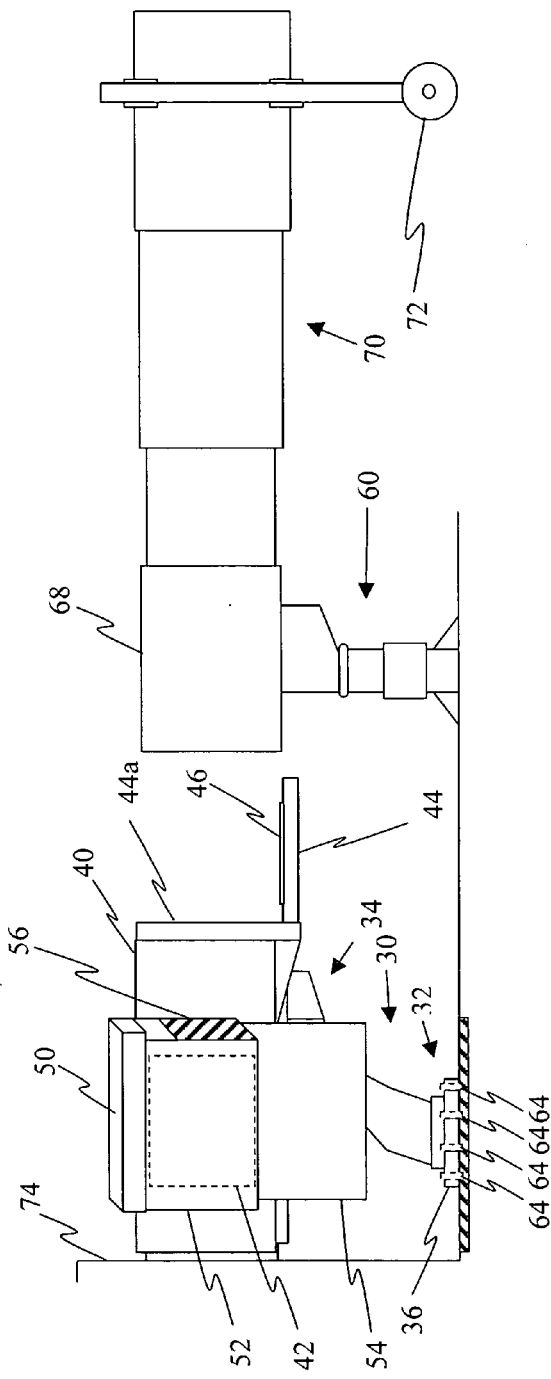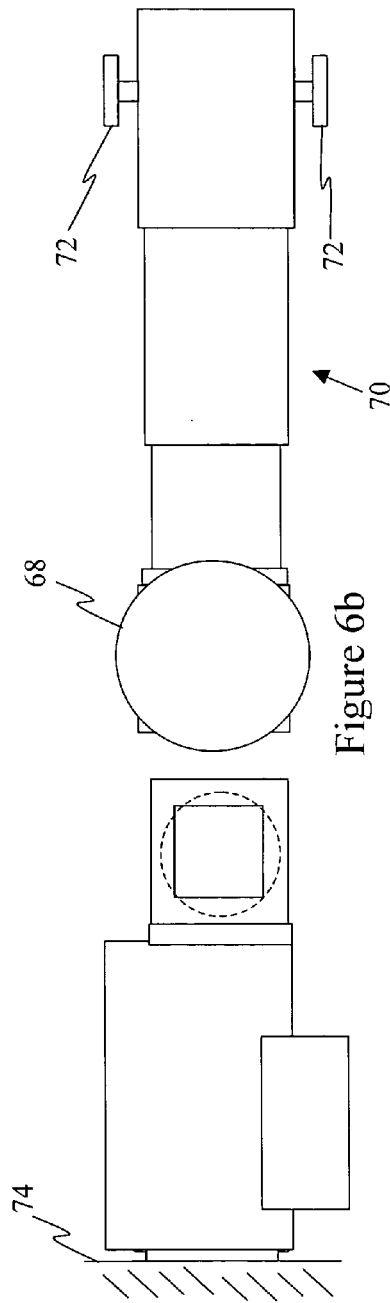
Figure 6a
Figure 6b

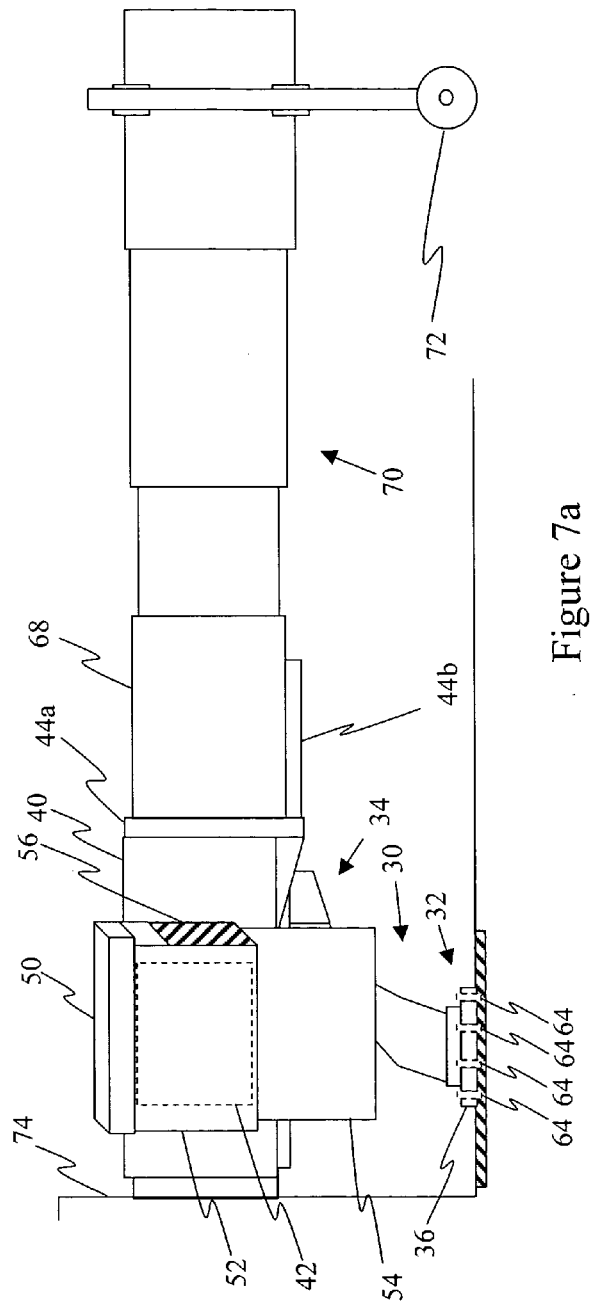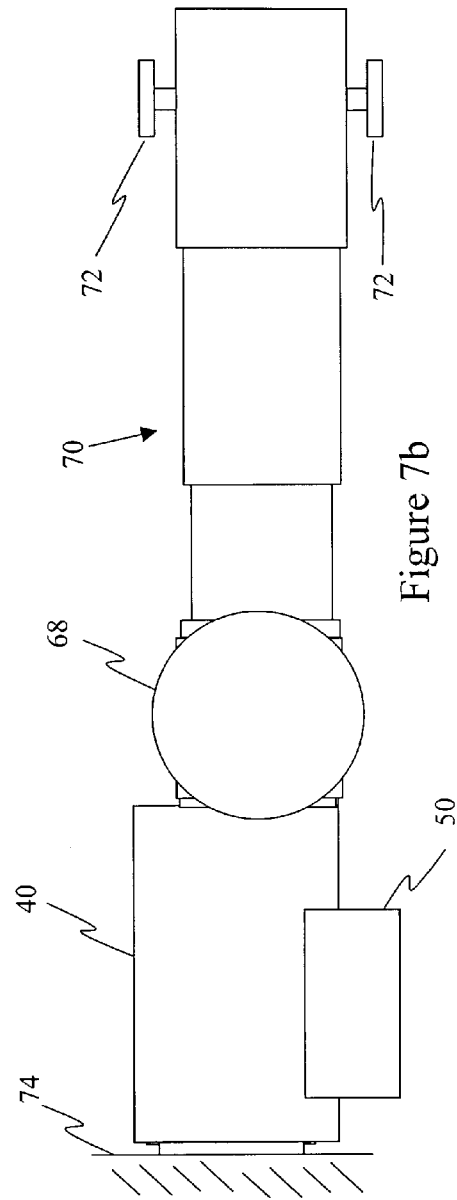
Figure 7a
Figure 7b

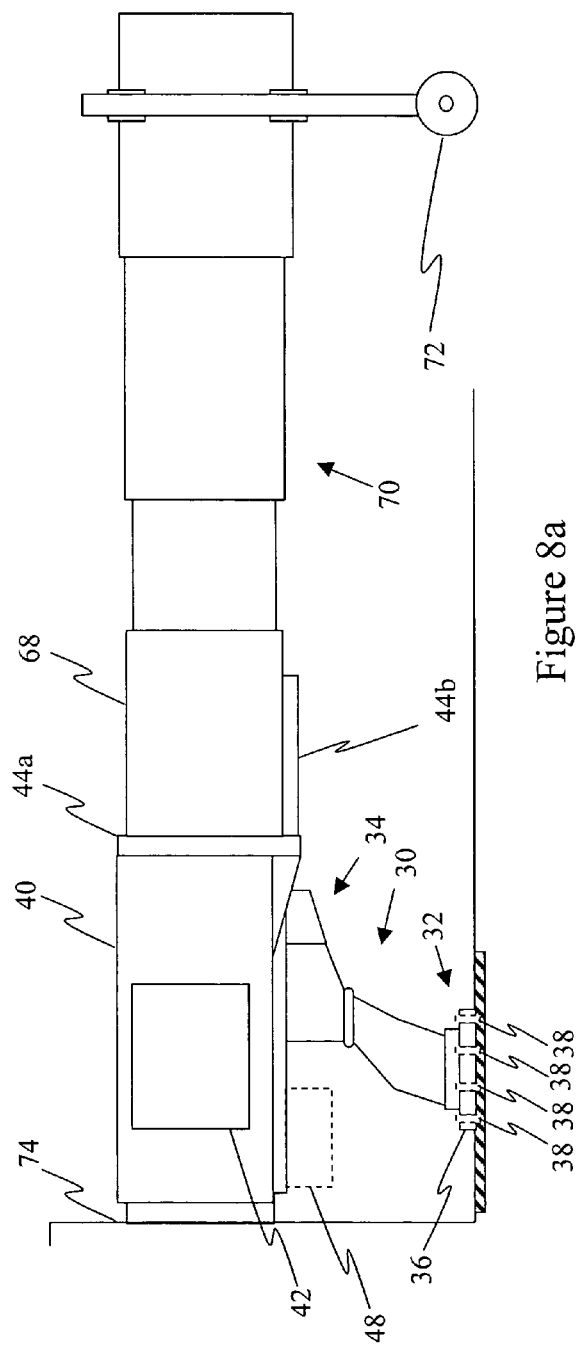
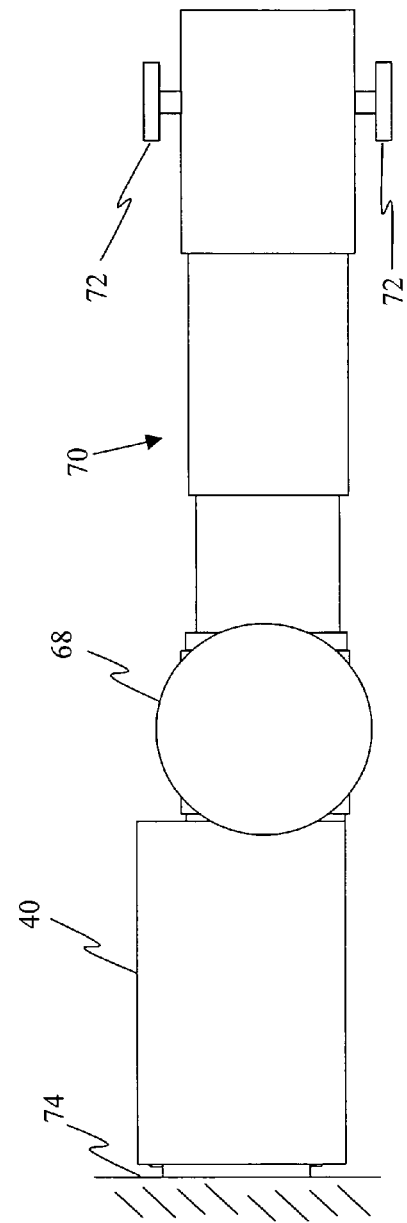
Figure 8a
Figure 8b

AIRPORT BAGGAGE LIFT SYSTEM

The instant invention relates generally to a baggage lift system and more particularly to a baggage lift system for transferring baggage between the interior of a passenger boarding bridge and the apron.

One convenience offered to passengers traveling by regional aircraft is "plane-side" baggage service. At the time of departure, passengers move across the tarmac surface and deposit baggage upon a baggage cart prior to ascending a stairway or a ramp to the regional aircraft. A ground crew loads the baggage into the regional aircraft prior to departure. Upon arrival at a destination, another ground crew unloads the baggage from the regional aircraft, places the baggage onto another cart, and wheels the cart to a pick-up point. Passengers retrieve baggage from the cart prior to entering a terminal building or boarding a shuttle vehicle.

The growing use of passenger boarding bridges, and in particular apron drive bridges, with regional aircraft requires airlines and airports to either remove this service, or to increase the strain on ground crew personnel who must move the baggage from inside the passenger boarding bridge to the aircraft. In the latter case, the baggage is generally carried up or down a confined stairway usually on the outside of the bridge and the person carrying the baggage generally has to negotiate through a doorway from the stairway into the interior of the bridge and vice versa. Because of the confines of the stairway and the awkwardness that results, the likelihood of personal injury is always present.

Of course, baggage lift systems are known for moving baggage between the apron and the inside of a passenger boarding bridge. One example is the Dew Valet™ system. The Dew Valet™ bridge mounted unit is an elevating device for lifting and lowering "plane-side" baggage between the apron and the inside of a passenger boarding bridge. The Dew Valet™ bridge mounted unit is very well suited for use with radial drive bridges. Unfortunately, it is necessary to cut a hole in the A-Tunnel in order to use the Dew Valet™ bridge mounted unit with an apron drive bridge. This reduces the retraction capability of the apron drive bridge. Additionally, the A-Tunnel is narrow and is not a good place to restrict passenger flow due to baggage retrieval.

The Dew Valet™ free standing unit operates using the same principles as the bridge mounted version, but is anchored to the apron and is usually used to access the terminal holdroom directly. Unfortunately, the airports that are seeing the greatest increase in the number of regional jets are existing facilities, which typically do not lend themselves well to having holes cut in the terminal holdroom. Furthermore, it may be necessary to either expand an existing concrete foundation or to add an additional concrete foundation in order to accommodate and support the free standing unit.

The Dew Valet™ apron mounted unit includes a tunnel interface between the terminal building and the rotunda. This tunnel interface contains an apron level compartment into which a baggage cart can be pushed. Passengers access "plane-side" baggage via an interior rollup door of the tunnel interface. The apron mounted unit is well suited for use with new passenger boarding bridge installations, since the concrete foundation may be designed to accommodate both the rotunda and the tunnel interface between the terminal building and the rotunda. However, in the case of an existing passenger boarding bridge the existing foundation is centered a standard distance of 4'6" from the face of the terminal. Since the tunnel interface is typically 8'×8', the rotunda is substantially offset from the existing foundation after installation of the unit. Accordingly, when being installed with an existing passenger boarding bridge, it is necessary to either provide an additional foundation for supporting the rotunda, which is likely to cost more than the cost of the unit being installed, or to construct a cumbersome support for transferring the load of the rotunda onto the existing foundation. In either case, the tunnel interface is attached to the rotunda only at approximately floor level and must be supported from below, for example using a "drop leg."

In United State Patent Application 2003/0178259, filed Mar. 25, 2002, Henderson describes a system that is similar to the Dew Valet™ apron mounted unit. A baggage hoist frame is used to raise and lower an elevator car between a lower station and an upper station. Henderson is not specific about access into the interior of the passenger boarding bridge, but states that an existing door of the bridge, and an area surrounding the door, is modified to provide access to the interior of the bridge or to the passenger terminal. This system also suffers the above-mentioned limitations of the prior art.

In general, the components that are required for adapting an existing passenger boarding bridge to include a baggage lift are known separately in the prior art. These components include a tunnel interface walkway element for being disposed between the terminal face and the rotunda, a baggage lift mechanism, a support anchored to an existing foundation and for supporting the rotunda, and a mount for attaching the tunnel interface to the rotunda. The prior art tunnel interface is typically dimensioned to support mounting of a baggage lift mechanism along one side thereof, and to provide sufficient interior space to facilitate baggage deposit/retrieval by passengers, without substantially restricting passenger flow through the interface. The prior art tunnel interface typically is attached to the rotunda at a mounting end and at approximately floor level only, via the mount, and a weatherproof seal is provided to protect passengers moving between the tunnel interface and the rotunda. A "drop leg" is provided at an end opposite the mounting end, for supporting the prior art tunnel interface. The prior art support for supporting the rotunda and for transferring the moment of the passenger boarding bridge to the foundation, typically is of heavy-duty construction, resulting in higher installation and materials costs.

It would be advantageous to provide a kit for retrofitting an existing passenger boarding bridge to include a baggage-lift portion that overcomes the above-mentioned limitations of the prior art.

It would be further advantageous to provide a kit for retrofitting an existing passenger boarding bridge to include a baggage-lift portion that is installed as a unit.

SUMMARY OF THE INVENTION

In accordance with an aspect of the instant invention there is provided a baggage handling unit for retrofitting an existing passenger boarding bridge having a foundation, the baggage handling unit comprising: a walkway for coupling a terminal building access port and a rotunda of an existing passenger boarding bridge so as to support passenger movement therebetween, the walkway including a baggage access port; a support including a mounting end configured for engaging the foundation and a support end for supporting the rotunda of the existing passenger boarding bridge at a position that is horizontally displaced from the foundation; a baggage elevating element mounted adjacent to the baggage access port of the walkway; and, a mount for fixedly coupling the baggage handling unit to the rotunda about a point opposite an aircraft engaging portion of the existing passenger boarding bridge, such that the baggage handling unit and the rotunda are structurally attached.

In accordance with another aspect of the instant invention there is provided a baggage handling unit for retrofitting an existing passenger boarding bridge having a foundation, the baggage handling unit comprising: a walkway for coupling a terminal building access port and a rotunda of an existing passenger boarding bridge so as to support passenger movement therebetween, the walkway including a baggage access port; a baggage elevating element mounted adjacent to the baggage access port of the walkway; a mount for structurally coupling the baggage handling unit to the rotunda opposite an aircraft engaging portion of the existing passenger boarding bridge; and, a support for mounting the baggage handling unit to the foundation such that the baggage handling unit at least partially counterbalances the aircraft. engaging portion of the existing passenger boarding bridge, and such that a moment imposed from the baggage handling unit to the foundation is at least partially compensated.

In accordance with yet another aspect of the instant invention there is provided a method of retrofitting an existing passenger boarding bridge having a foundation, comprising; providing a baggage handling unit including a support configured for engaging a mounting structure of the foundation and including a mount configured for structurally coupling the baggage handling unit to a rotunda of the existing passenger boarding bridge; displacing the existing passenger boarding bridge from the foundation; mounting the baggage handling unit to the foundation via the support and the mounting structure of the foundation; and, structurally mounting the rotunda of the existing passenger boarding bridge to the baggage handling unit via the mount, such that the rotunda is supported at a position that is horizontally displaced from the foundation.

Exemplary embodiments of the invention will now be described in conjunction with the following drawings, in which similar reference numbers designate similar items:

FIG. 1a is a simplified side view of an existing passenger boarding bridge modified to include a baggage lift portion according to the prior art;

FIG. 1b is a simplified top view of an existing passenger boarding bridge modified to include a baggage lift portion according to the prior art;

FIG. 2b is a simplified side view of a baggage lift module according to an embodiment of the instant invention, including an optional counter-weight, and with the baggage elevating element omitted for clarity;

FIG. 4a is a simplified side view of an existing prior art passenger boarding bridge supported on an existing foundation via a rotunda column;

FIG. 4b is a simplified top view of an existing prior art passenger boarding bridge supported on an existing foundation via a rotunda column;

FIG. 5a is a simplified side view of an existing prior art passenger boarding bridge after being moved away from an existing foundation so as to accommodate a baggage lift module according to an embodiment of the instant invention;

FIG. 5b is a simplified top view of an existing prior art passenger boarding bridge after being moved away from an existing foundation so as to accommodate a baggage lift module according to an embodiment of the instant invention;

FIG. 6a is a simplified side view of a baggage lift module according to an embodiment of the instant invention disposed between a terminal face and an existing prior art passenger boarding bridge, which has been moved away from an existing foundation so as to accommodate the baggage lift module;

FIG. 6b is a simplified top view of a baggage lift module according to an embodiment of the instant invention disposed between a terminal face and an existing prior art passenger boarding bridge, which has been moved away from an existing foundation so as to accommodate the baggage lift module;

FIG. 7a is a simplified side view of an existing prior art passenger boarding bridge after being retrofitted with a baggage lift module according to an embodiment of the instant invention;

FIG. 7b is a simplified top view of an existing prior art passenger boarding bridge after being retrofitted with a baggage lift module according to an embodiment of the instant invention;

FIG. 8a is a simplified side view of an existing prior art passenger boarding bridge after being retrofitted with a baggage lift module according to an embodiment of the instant invention, with the baggage elevating element omitted for clarity;

Figure 9:
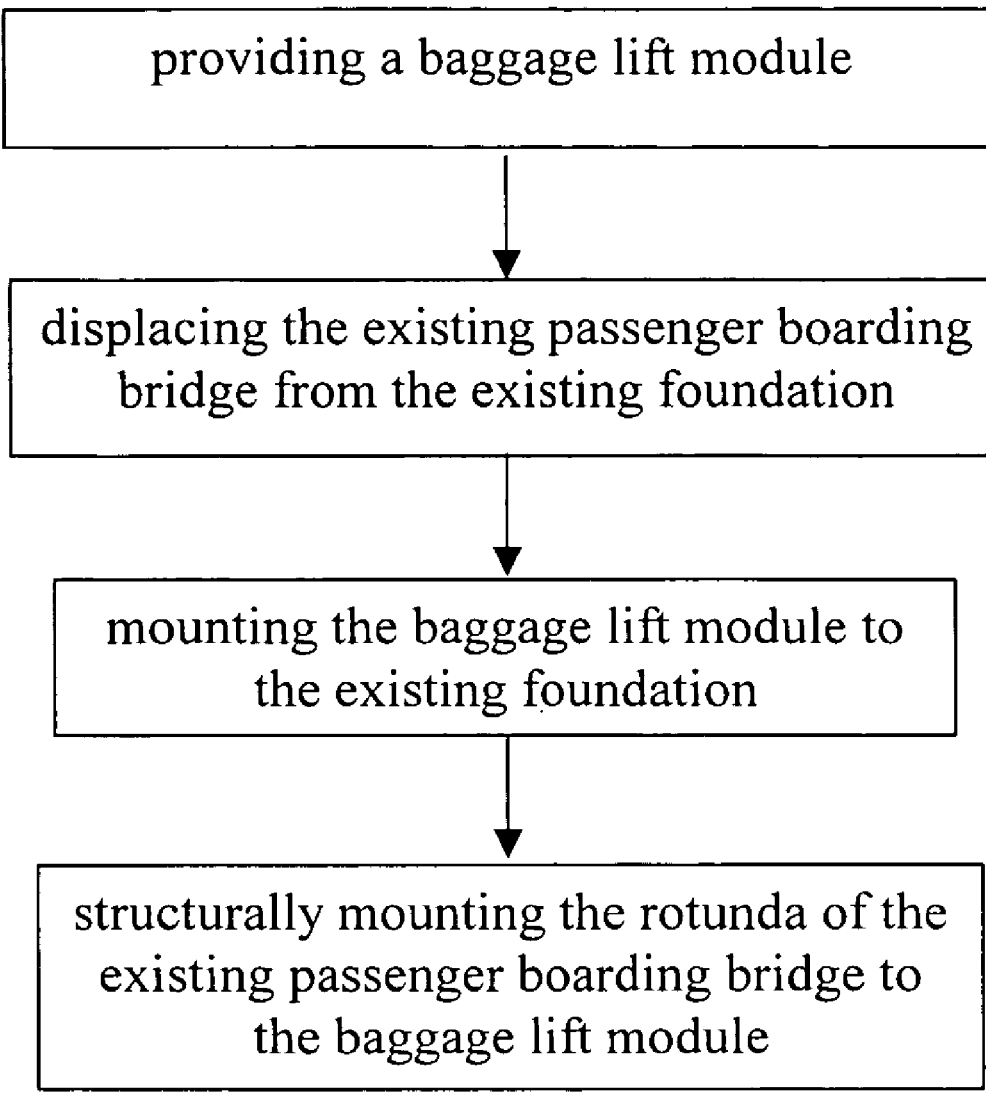

FIG. 8b is a simplified top view of an existing prior art passenger boarding bridge after being retrofitted with a baggage lift module according to an embodiment of the instant invention, with the baggage elevating element omitted for clarity; and, FIG. 9 is a simplified flow diagram for a method of retrofitting an existing passenger boarding bridge having an associated existing foundation to include a baggage lift module.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. Throughout this disclosure and in the claims that follow, it is to be understood that following definitions shall be accorded to the following terms. The "load" of a structure is defined as the combined forces and torques necessary to properly and safely support the structure. For example, the load of a passenger boarding bridge is described as being supported by a foundation. Said load will vary depending on, for example, whether there are people in the passenger boarding bridge, the ambient weather conditions, as well as the extent to which the passenger boarding bridge is extended. For clarity, the term "moment" is used in the context of torque and not in the context of a moment of inertia.

According to some embodiments of the instant invention, a baggage lift module supporting simple installation is provided for retrofitting an existing passenger boarding bridge. The module is a unit comprising an offset-support, a walkway element, a mount for coupling the walkway element to a rotunda of the existing passenger boarding bridge, and a baggage elevating element. In particular, the offset-support includes a mounting end for being mounted to an existing foundation that is associated with an existing passenger boarding bridge, and a support end opposite the mounting end. The offset-support is for supporting the rotunda of the existing passenger boarding bridge at a position that is horizontally offset from the existing foundation. Preferably, the mounting end includes a mounting plate having holes formed therethrough for receiving eight studs coming out of the existing foundation in the industry standard "number 7 bolt pattern", the center of the "number 7 bolt pattern" being approximately 4'6" from the terminal wall. Optionally, the support end is mounted to a portion of the walkway element or to a portion of the mount, or to portions of both the walkway element and the mount. In any case, the mount for coupling the walkway element to the rotunda of the existing passenger boarding bridge provides a structural connection between the walkway element and the rotunda of the existing passenger boarding bridge. Accordingly, the mount of the baggage lift module at least partially structurally supports the rotunda. As such, the load of each one of the walkway element and the rotunda of the existing passenger boarding bridge is transferred to the existing foundation via the offset support. In addition, since the mount provides a structural connection between the walkway element and the rotunda of the existing passenger boarding bridge, the load of the walkway element counterbalances the load of the rotunda of the existing passenger boarding bridge, and thereby at least partially offsets the moment of the passenger boarding bridge on the foundation. Finally, the walkway element includes two vertical sidewall members, a floor member and a ceiling member and is open at opposite ends thereof. The walkway element includes an access port in one of the two vertical sidewall members. The baggage elevating element is mounted adjacent to an external surface of the one of the two vertical sidewall members and is aligned with the access port in the one of the two vertical sidewall members. The access port allows baggage to be loaded onto or removed from the baggage elevating element when the baggage elevating element is in a raised condition. When the baggage elevating element is in a lowered condition a barrier, such as for example a roll-down door, covers the access port to prevent persons or objects from falling therethrough.

Referring now to FIGS. 1a and 1b, shown are simplified side and top views, respectively, of an existing passenger boarding bridge modified to include a baggage lift portion according to the prior art. A support structure 2 is provided for supporting the rotunda 4 at a position horizontally offset from an existing foundation 6. An extensible walkway 8 is mounted at one end of the rotunda 4, and is supported at an aircraft engaging end thereof by a height adjustable wheeled carriage 10. A tunnel interface walkway element 12 is mounted at an end of the rotunda 4 opposite the extensible walkway 8, and is disposed between the rotunda 4 and the terminal building 14. The tunnel interface walkway element 12 is supported at an end opposite the rotunda by a "drop leg" support 16. A baggage elevating element 18 is mounted adjacent to an external surface of one of the two vertical sidewall members of the tunnel interface walkway element 12, and is aligned with an access port 20 in the one of the two vertical sidewall members. For example, the support structure 2 is of a box-beam construction, and is designed to support the load imposed by the rotunda 4 and the extensible walkway 8. The tunnel interface walkway element 12 is mounted to the rotunda 4 via a floor connector only, and accordingly the end opposite the floor connector must be supported by a "drop leg" support 16. The baggage elevating element 18 includes a lift mechanism 22 and baggage enclosure 24. The lift mechanism 22 is for moving the baggage enclosure 24 between the raised position, as illustrated in FIGS. 1a and 1b, and a not illustrated lowered position adjacent to the apron surface.

Figure 2A:
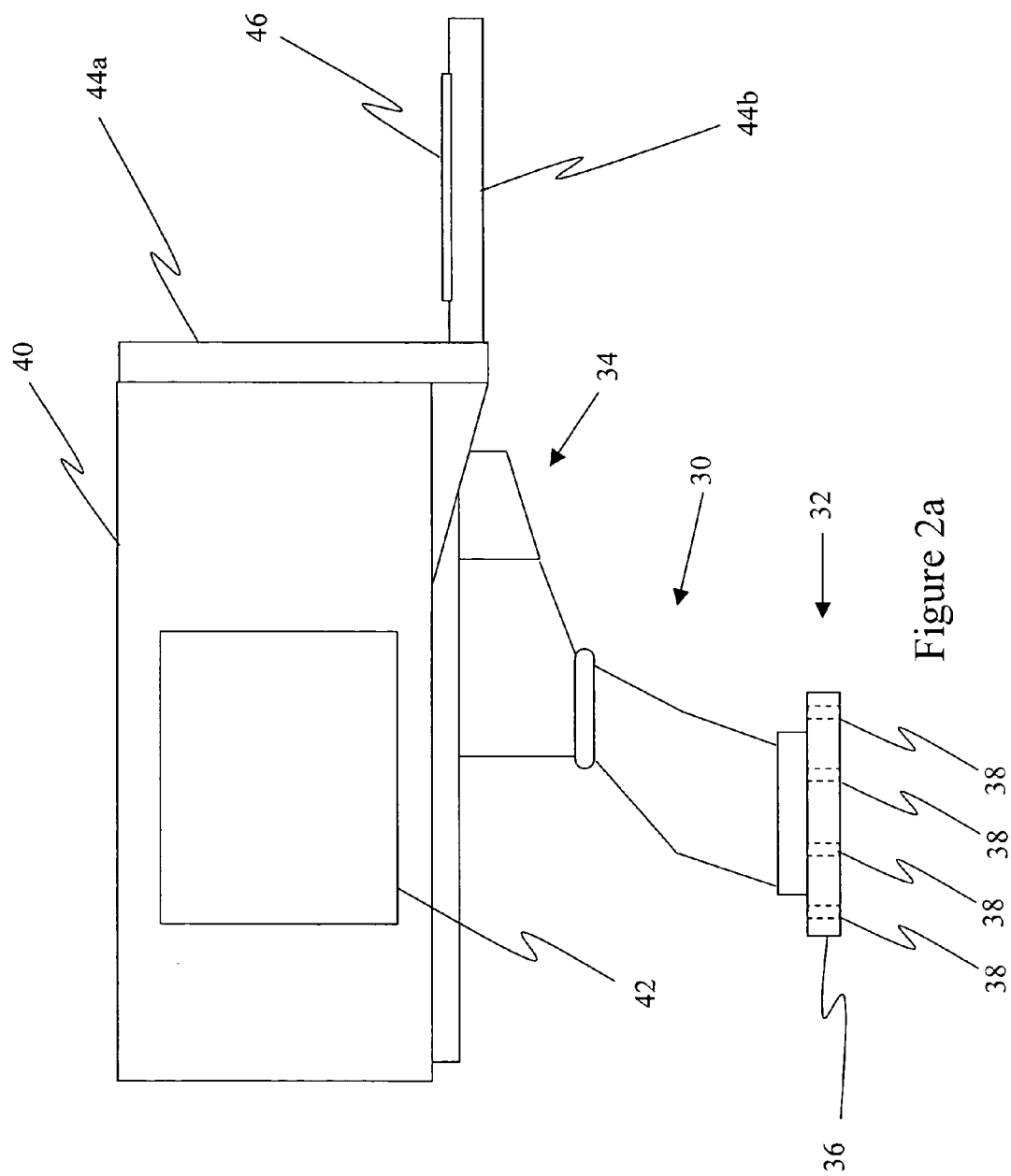
FIG. 2a is a simplified side view of a baggage lift module according to an embodiment of the instant invention and with the baggage elevating element omitted for clarity.

Referring now to FIG. 2a, shown is a simplified side view of a baggage lift module according to an embodiment of the instant invention and with the baggage elevating element omitted for clarity. The baggage lift module includes an offset-support 30 having a mounting end 32 for being mounted to an existing foundation (not illustrated) associated with an existing passenger boarding bridge (not illustrated) and having an opposite support end 34, the offset-support for supporting a rotunda of the existing passenger boarding bridge at a position that is horizontally offset from the mounting end 32. Preferably, the mounting end 32 includes a mounting plate 36 having holes 38 formed therethrough for receiving eight studs (not illustrated) coming out of the existing foundation in the industry standard "number 7 bolt pattern", the center of the "number 7 bolt pattern" being approximately 4'6" from the terminal wall. Mounted at the support end 34 of the offset-support 30 is a walkway element 40 having two vertical sidewall members, a floor member and a ceiling member and being open at opposite ends thereof. In an installed condition, the walkway element 40 is supported by the offset-support 30 at a location between a not illustrated terminal building access port and a not illustrated rotunda of an existing passenger boarding bridge, so as to support passenger movement therebetween. The walkway element 40 further includes an access port 42 in one of the two vertical sidewall members. The access port 42 allows baggage to be loaded onto or removed from a baggage enclosure of a not illustrated baggage elevating element when the baggage enclosure is in a raised condition. When the baggage enclosure is in a lowered condition, a not illustrated barrier, such as for example a roll-down door, covers the access port to prevent persons or objects from falling therethrough.

The walkway element 40 is supported by the offset-support 30 such that the center of mass of the baggage lift module is located at a position vertically offset from but otherwise on or proximate to the mounting plate 36. In this way, the mounting plate 36 provides the existing foundation 6 a compressive load absent a large moment because the weight of the baggage lift module along the terminal side of the mounting plate 36 at least partially counter-balances the weight of the baggage lift module along the outboard side of the mounting plate 36. In addition, a mount 44a, 44b is provided for coupling the rotunda of an existing passenger boarding bridge to the walkway element 40 along the vertical sidewall members and floor member thereof, respectively. Optionally, the mount includes a support portion proximate the ceiling member of the walkway element 40. The mount of the baggage lift module is for at least partially structurally supporting the rotunda. Preferably, the mount includes a portion 46 having a mounting structure substantially identical to a standard mounting structure of a rotunda column. For instance, during installation of the baggage lift module, an existing rotunda column (not illustrated) is detached from the rotunda, and the rotunda is subsequently seated onto the portion 46 of the baggage lift module mount.

Referring now to FIG. 2b, shown is a simplified side view of a baggage lift module according to an embodiment of the instant invention, including an optional counter-weight 48, and with the baggage elevating element omitted for clarity. In particular, the optional counterweight 48 is disposed along a portion of the walkway element 40 that is along the terminal side of mounting plate 36. Accordingly, the optional counter-weight 48, when present, at least partially reduces the moment provided from the mounting plate 36 to the existing foundation 6 by counter-balancing the load resulting from components along the outboard side of mounting plate 36.

Figure 2C:
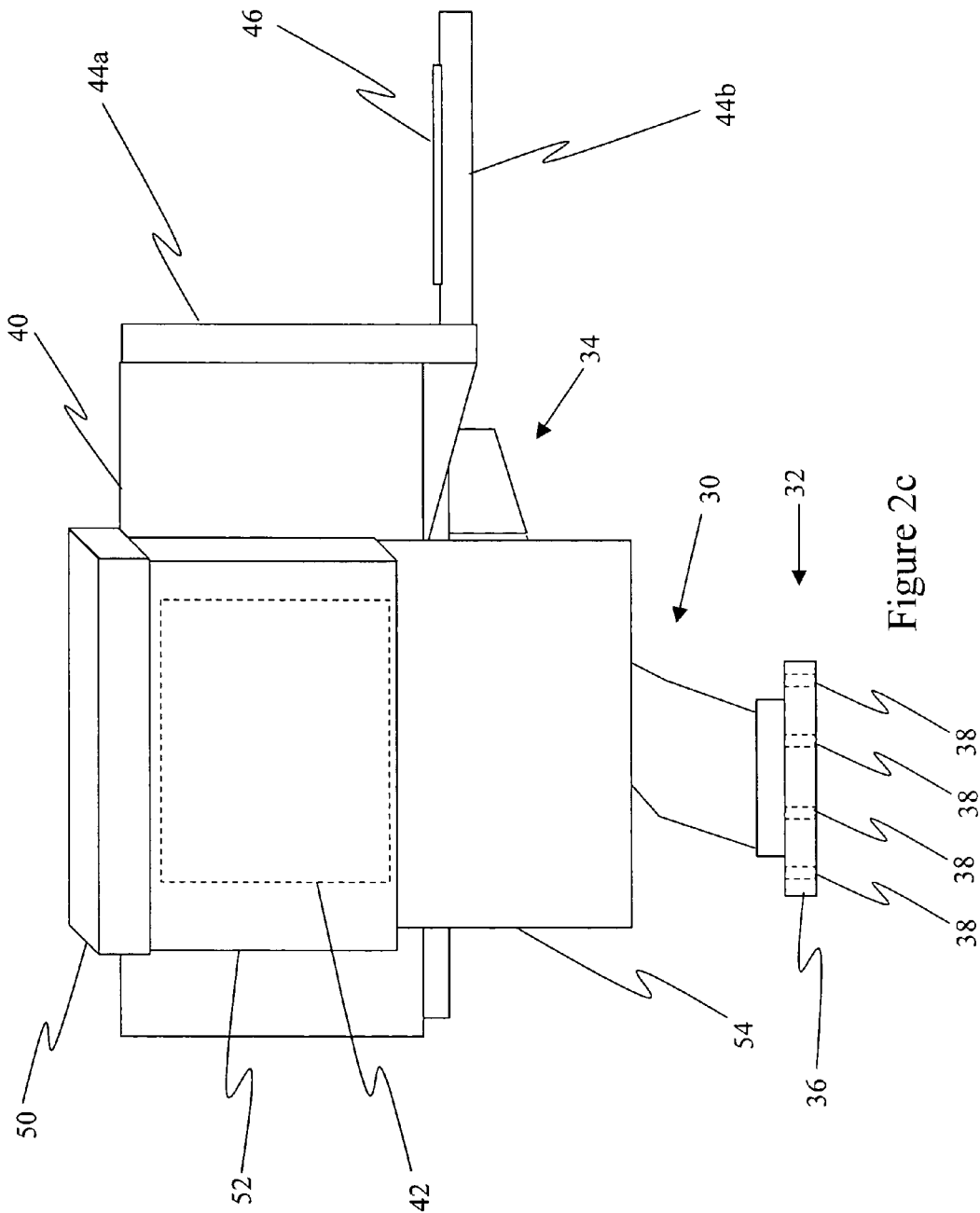
FIG. 2c is a simplified side view of a baggage lift module according to an embodiment of the instant invention including the baggage elevating element.

Referring now to FIG. 2c, shown is a simplified side view of a baggage lift module according to an embodiment of the instant invention including the baggage elevating element. In particular, the baggage elevating element includes a controllable baggage lift mechanism 50 and a baggage enclosure 52. The controllable baggage lift mechanism 50 is for moving the baggage enclosure 52 between the raised position as illustrated in FIG. 2c and a not illustrated lowered position adjacent to the apron surface. A guide 54 is provided for guiding the baggage enclosure 52 along the vertical sidewall member of the walkway element 40 during operation of the baggage elevating element.

Figure 3A:
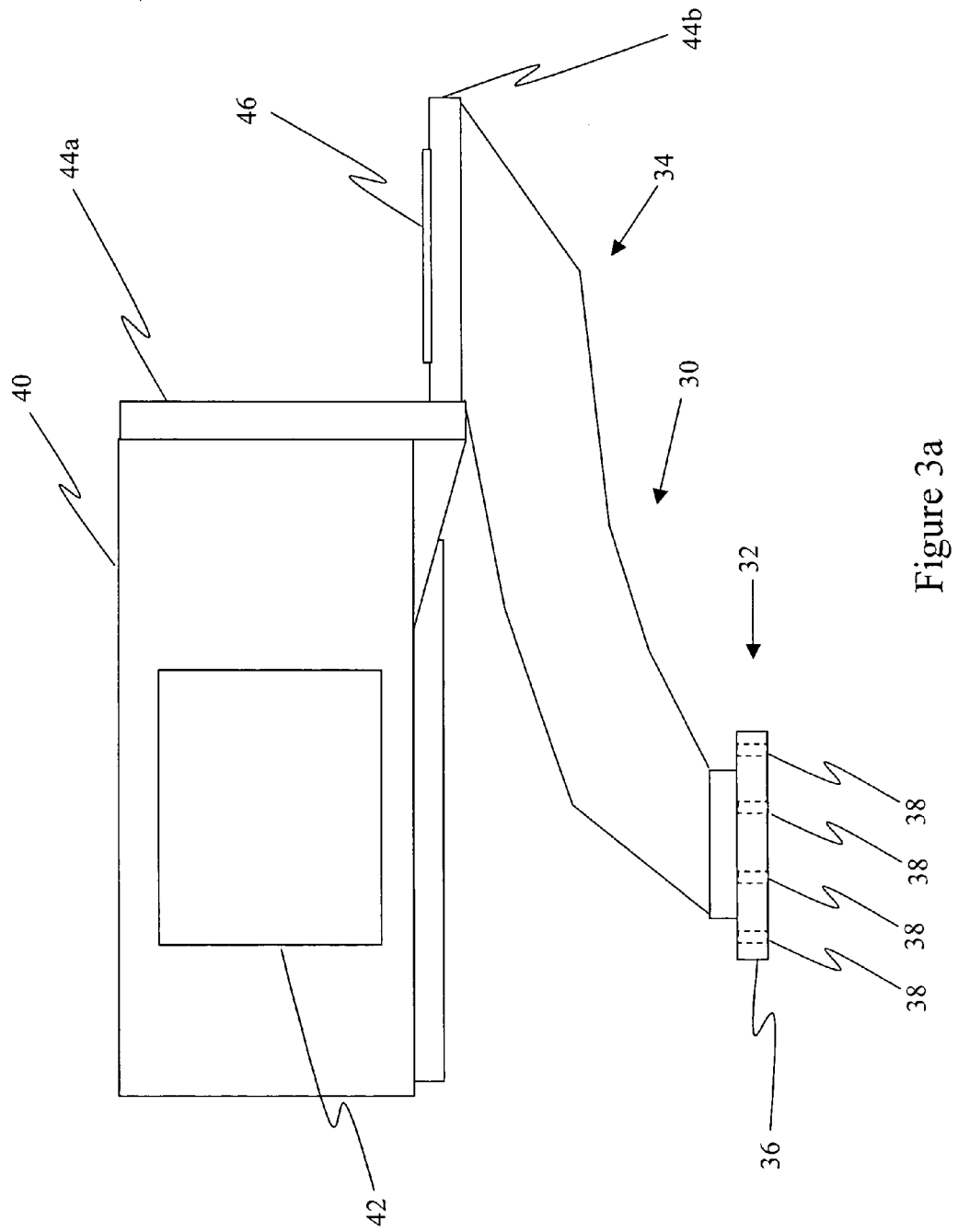
FIG. 3a is a simplified side view of a baggage lift module according to another embodiment of the instant invention and with the baggage elevating element omitted for clarity.

Referring now to FIG. 3a, shown is a simplified side view of a baggage lift module according to another embodiment of the instant invention and with the baggage elevating element omitted for clarity. In the embodiment of FIG. 3a, the support end 34 is fixed to the mount 44b and is substantially aligned with the portion 46. Accordingly, the support end 34 of the offset-support is disposed substantially below the point at which the rotunda is mounted to the baggage lift module.

Figure 3B:
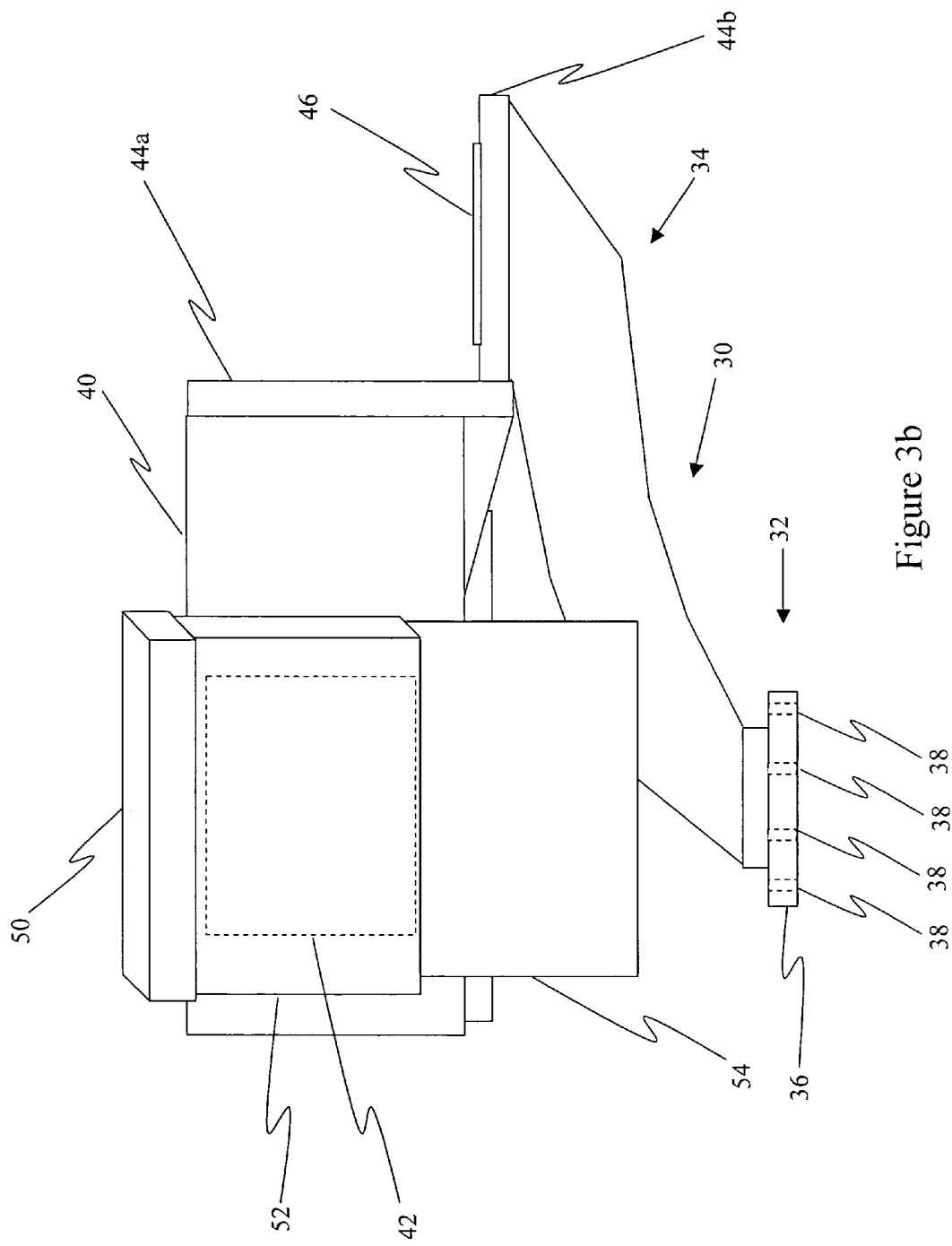
FIG. 3b is a simplified side view of a baggage lift module according to another embodiment of the instant invention including the baggage elevating element.

Referring now to FIG. 3b, shown is a simplified side view of a baggage lift module according to another embodiment of the instant invention and including the baggage elevating element. The baggage lift module shown at FIG. 3b operates in a manner substantially similar to that described with reference to the baggage lift module shown at FIG. 2c.

A process for retrofitting an existing prior art passenger boarding bridge to include a baggage lift module according to an embodiment of the instant invention is described with reference to FIGS. 4a to 8b. Referring now to FIGS. 4a and 4b, shown are simplified side and top views, respectively, of an existing prior art passenger boarding bridge supported on an existing foundation 6 via a rotunda column 60. The rotunda column 60 includes a mounting plate 62 having holes formed therethrough for receiving studs 64 coming out of the existing foundation 6. In FIG. 4a, only four of the eight studs 64 in the industry standard "number 7 bolt pattern" are illustrated, the center of the "number 7 bolt pattern" being approximately 4'6" from the terminal wall. An extensible walkway 70 is mounted and supported at an inboard end thereof at the rotunda 68, and is supported at an outboard end thereof by a height adjustable wheeled carriage 72. The rotunda 68 is provided with a non-structural mount to the terminal building 74. During use, the rotunda column 60 supports the rotunda 68 and the extensible walkway 70 via the existing foundation 6.

Referring now to FIGS. 5a and 5b, shown are simplified side and top views, respectively, of an existing prior art passenger boarding bridge after being moved away from an existing foundation so as to accommodate a baggage lift module according to an embodiment of the instant invention. For example, the rotunda column is used to temporarily support the existing prior art passenger boarding bridge at a position away from the existing foundation 6. Optionally, another temporary support is used to temporarily support the existing prior art passenger boarding bridge at a position away from the existing foundation 6. Only four of the eight studs 64 of the industry standard "number 7 bolt pattern" are illustrated in FIG. 5a, but it is to be understood that the remaining four studs 64 are also coming out of the existing foundation 6 at appropriate locations.

Referring now to FIGS. 6a and 6b, shown are simplified side and top views, respectively, of a baggage lift module according to an embodiment of the instant invention disposed between a terminal face and an existing prior art passenger boarding bridge, which has been moved away from an existing foundation so as to accommodate the baggage lift module. A mounting plate 36 at a mounting end 32 of an offset-support 30 of the baggage lift module includes a plurality of holes provided therethrough for receiving eight bolts 64 of the industry standard "number 7 bolt pattern" coming out of the existing foundation 6. Suitable fasteners (not illustrated) are provided for securing the mounting plate 36 against the existing foundation 6 via the eight bolts 64. Preferably, the baggage lift module is mounted onto the existing foundation 6 and is mounted to the terminal building 74 prior to the existing prior art passenger boarding bridge being mounted via the mount 44a, 44b. As shown at FIG. 6a, the baggage lift module includes a baggage elevating element including a controllable baggage lift mechanism 50 and a baggage enclosure 52. The baggage enclosure 52 includes an access port or door 56 that is sized appropriately for allowing a baggage cart to be wheeled into and out of the baggage enclosure 52. The controllable baggage lift mechanism 50 is for moving the baggage enclosure 52 between the raised position as illustrated in FIG. 6a and a not illustrated lowered position adjacent to the apron surface. In the illustrated embodiment, the controllable baggage lift mechanism 50 is a winch and cable type system, but of course other suitable controllable baggage lift mechanisms may be easily envisaged by one of skill in the art. For instance, the controllable baggage lift mechanism is optionally provided as a fluid pressure operated ram disposed below the baggage enclosure 52. A guide 54 is provided for guiding the baggage enclosure 52 along the vertical sidewall member of the walkway element 40 during operation of the baggage elevating element.

Referring now to FIGS. 7a and 7b, shown are simplified side and top views, respectively, of an existing prior art passenger boarding bridge that has been retrofitted with a baggage lift module according to an embodiment of the instant invention. The rotunda 68 has been removed from the rotunda column 60 and is mounted to the baggage lift module via the mount 44a, 44b. The mount 44a, 44b is a structural mount for attaching the rotunda 68 to the baggage lift module. In particular, the mount 44a, 44b at structurally supports the rotunda 68. As such, the load of each one of the walkway element 40 and the rotunda 68 of the existing prior art passenger boarding bridge is transferred to the existing foundation 6 via the offset-support 30 in conjunction with the mount 44a, 44b.

Figure 7C:
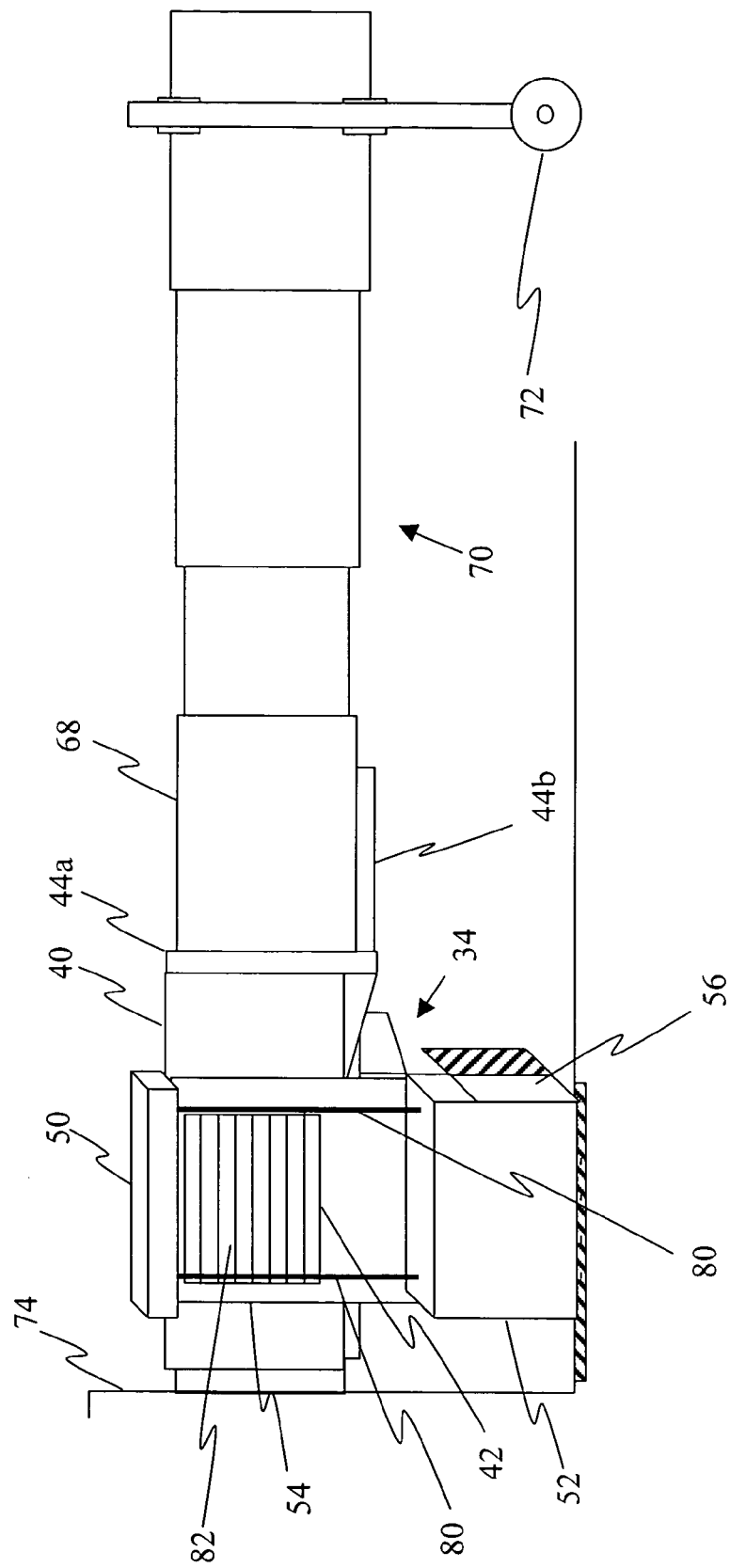
FIG. 7c is a simplified side view of an existing prior art passenger boarding bridge that has been retrofitted with a baggage lift module according to an embodiment of the instant invention, and with the baggage enclosure in a lowered condition.

Referring now to FIG. 7c, shown is a simplified side view of an existing prior art passenger boarding bridge that has been retrofitted with a baggage lift module according to an embodiment of the instant invention, and with the baggage enclosure in a lowered condition. In particular, the controllable baggage lift mechanism 50, for instance a winch type mechanism including cables 80, has been actuated to lower the baggage enclosure 52 to a height of the apron surface. The access port or door 56 of the baggage enclosure 52 is shown in an open condition for allowing a baggage cart to be wheeled into or out of the baggage enclosure 52. A barrier 82, such as for instance a roll-down door, blocks the access port 42 in one of the two vertical sidewall members of the walkway element 40, so as to prevent persons or objects from falling therethrough. Preferably, the barrier 82 provides a substantially weather-tight seal so as to ensure the comfort passengers within the walkway element 40.

Referring now to FIGS. 8a and 8b, shown are simplified side and top views, respectively, of an existing passenger boarding bridge that has been retrofitted with a baggage lift module according to an embodiment of the instant invention, with the baggage elevating element omitted for clarity. An optional counter-weight 48 is shown mounted to the lower surface of the walkway element 40. For instance, the optional counter-weight is fabricated from one or more of steel and concrete, or from another suitable material. Advantageously, the combined weight and additional external forces imparted on the portion of the walkway element 40 to the left of the mounting plate 36 in FIG. 8a, as well as the baggage elevating element and the optional counter-weight (when present), act to at least partially counter balance the weight and any external forces that are imposed by the rotunda 68 and the extensible walkway 70 on the existing foundation 6.

Referring now to FIG. 9, shown is a simplified flow diagram for a method of retrofitting an existing passenger boarding bridge having an associated existing foundation to include a baggage lift module according to an embodiment of the instant invention. The method according to FIG. 9 comprises a step 100 of providing a baggage lift module according to an embodiment of the instant invention. For instance, the baggage lift module includes a first mount configured for engaging an existing mounting structure of the existing foundation and a second mount configured for structurally coupling the baggage lift module to a rotunda of the existing passenger boarding bridge. At step 102, the existing passenger boarding bridge is displaced from the existing foundation. At step 104, the baggage lift module is mounted to the existing foundation via the first mount and the existing mounting structure of the existing foundation. At step 106, the rotunda of the existing passenger boarding bridge is structurally mounted to the baggage lift module via the second mount Preferably, operation of the baggage elevating element is performed from a pushbutton station located on the exterior at the base of the unit. From this position an operator can view any obstructions or hazards. Access from inside the bridge is only granted once the baggage enclosure has been raised into position.

Optionally, the offset-support is height adjustable for accommodating different terminal building access port heights above the apron surface. For instance, removable spacers of varying heights may be added to or removed from the offset-support prior to installing the baggage lift module. Alternatively, the offset-support includes a telescoping section which may be locked at a desired position. Further alternatively, a plurality of offset-supports are made available, each offset-support of the plurality of offset-supports having a different height corresponding to a common terminal building access port height above the apron surface.

Further optionally, a plurality of different models of the baggage lift module is provided, each different model for use with one common type of existing prior art passenger boarding bridge. For instance, a first model of the plurality of different models includes at least one of a mount 44a, 44b and a mount portion 46 that is designed for use with a FMC Jetway Systems™ existing prior art passenger boarding bridge, a second model of the plurality of different models includes at least one of a mount 44a, 44b and a mount portion 46 that is designed for use with a Dewbrige™ existing prior art passenger boarding bridge, etc.

Advantageously, the loads imposed due to the offset mounting of the existing apron drive passenger boarding bridge do not create the need for new foundations. This is significant since, in many cases, it is necessary to provide the longest available apron drive bridge in order to get down to the height of a regional jet aircraft. Long apron drive passenger boarding bridges impose greater loads on the foundation compared to shorter apron drive passenger boarding bridges. Therefore, it is highly advantageous that the walkway element 40 is structurally mounted to the rotunda 68, such that the walkway element 40 may be cantilevered off the existing foundation so as to create a counterweight for at least partially counter-balancing the load imposed by the offset mounting of the apron drive bridge.

It is a further advantage of an embodiment of the instant invention that the offset-support is designed to support a retrofit installation of the baggage lift module. Installing a baggage lift module according to an embodiment of the instant invention minimizes the length of time that an existing passenger boarding bridge is out of service. It is necessary only to disengage the existing passenger boarding bridge from its installed condition, move the existing passenger boarding bridge out of the way, lower a baggage lift module according to an embodiment of the instant invention onto an existing mounting structure of an existing foundation, secure the baggage lift module to the foundation and to the terminal building, and finally move the existing passenger boarding bridge into engagement with a mount of the baggage lift module. After inspection, testing and set-up, the retrofitted existing passenger boarding bridge is ready to be put back into service with improved functionality for use with regional jet aircraft.

Numerous other embodiments may be envisaged without departing from the spirit and scope of the invention.

What is claimed is:

1. A baggage handling unit for retrofitting an existing passenger boarding bridge having an existing foundation that is formed within a portion of the apron surface below the passenger boarding bridge, the existing foundation including a plurality of studs protruding therefrom, the baggage handling unit comprising:

a walkway for coupling a terminal building access port and a rotunda of an existing passenger boarding bridge so as to support passenger movement therebetween, the walkway including a baggage access port;

a support including a mounting end configured for engaging the plurality of studs protruding from the existing foundation and a support end for supporting the rotunda of the existing passenger boarding bridge at a position that is horizontally displaced from the existing foundation;

a baggage elevating element mounted adjacent to the baggage access port of the walkway, the baggage elevating element including a controllable baggage lift mechanism and a baggage enclosure, the controllable baggage lift mechanism coupled to the baggage enclosure for controllably raising and lowering the baggage enclosure between an upper station adjacent to the access port of the walkway and a lower station at a height that is disposed elevationally below the access port of the walkway; and, a mount for fixedly coupling the baggage handling unit to the rotunda about a point opposite an aircraft engaging portion of the existing passenger boarding bridge, such that the baggage handling unit and the rotunda are structurally attached.

2. A baggage handling unit according to claim 1, wherein the baggage handling unit is for, in use, counterbalancing the aircraft engaging portion of the existing passenger boarding bridge such that a moment imposed from the baggage handling unit to the existing foundation is at least partially compensated.

3. A baggage handling unit according to claim 1, wherein a portion of the baggage handling unit is cantilevered off the existing foundation when the baggage handling unit is in an installed condition on the existing foundation.

4. A baggage handling unit according to claim 1, comprising a counter-weight mounted to the baggage handling unit for at least partially counterbalancing the aircraft engaging portion of the existing passenger boarding bridge such that a moment imposed from the baggage handling unit to the existing foundation is at least partially compensated.

5. A baggage handling unit according to claim 1, wherein the mounting end of said support comprises a mounting plate having a plurality of holes formed therethrough for receiving the plurality of studs protruding from the existing foundation.

6. A baggage handling unit according to claim 5, wherein the plurality of holes formed through the mounting plate is for receiving the plurality of studs protruding from the existing foundation in an industry standard number 7 bolt pattern.

7. A baggage handling unit according to claim 1, wherein the controllable baggage lift mechanism comprises a winch and cable mechanism.

8. A baggage handling unit according to claim 1, wherein the controllable baggage lift mechanism comprises a fluid pressure operated ram mechanism.

9. A baggage handling unit according to claim 1, comprising a controller for controlling the controllable baggage lift mechanism.

10. A baggage handling unit according to claim 9, wherein the controller comprises a push button station located proximate the lower station.

11. A baggage handling unit according to claim 1, wherein the walkway comprises a controllably movable barrier for preventing persons or objects from falling through the access port of the walkway when the baggage enclosure is lowered to the lower station.

12. A baggage handling unit according to claim 11, wherein the controllably movable barrier comprises a roll-down door.

13. A baggage handling unit according to claim 11, comprising a safety mechanism for releasing a lock of the controllably movable barrier in dependence upon the baggage enclosure being secured at upper station adjacent to the access port of the walkway.

14. A baggage handling unit for retrofitting an existing passenger boarding bridge having an existing foundation that is formed within a portion of the apron surface below the passenger boarding bridge, the existing foundation including a plurality of studs protruding therefrom, the baggage handling unit comprising:

a walkway for coupling a terminal building access port and a rotunda of an existing passenger boarding bridge so as to support passenger movement therebetween, the walkway including a baggage access port;

a baggage elevating element mounted adjacent to the baggage access port of the walkway, the baggage elevating element including a controllable baggage lift mechanism and a baggage enclosure, the controllable baggage lift mechanism coupled to the baggage enclosure for controllably raising and lowering the baggage enclosure between an upper station adjacent to the access port of the walkway and a lower station at a height that is disposed elevationally below the access port of the walkway;

a mount for structurally coupling the baggage handling unit to the rotunda opposite an aircraft engaging portion of the existing passenger boarding bridge; and, a support for mounting the baggage handling unit to the protruding studs of the existing foundation such that the baggage handling unit at least partially counterbalances the aircraft engaging portion of the existing passenger boarding bridge, and such that a moment imposed from the baggage handling unit to the existing foundation is at least partially compensated.

15. A baggage handling unit according to claim 14, wherein the support is for, in use, supporting the walkway via the existing foundation in a cantilever-like manner such that the baggage handling unit in combination with the aircraft engaging portion of the existing passenger boarding bridge exert a force that is mostly normal to the existing foundation.

16. A baggage handling unit according to claim 14, comprising a counter-weight mounted to the baggage handling unit for counterbalancing the aircraft engaging portion of the existing passenger boarding bridge such that a moment imposed from the baggage handling unit to the existing foundation is at least partially compensated.

17. A baggage handling unit according to claim 14, wherein the support includes a mounting plate for engaging a mounting structure of the existing foundation, the mounting structure of the existing foundation comprising the plurality of studs protruding from the existing foundation.

18. A baggage handling unit according to claim 17, wherein the mounting plate includes a plurality of holes formed therethrough for receiving the plurality of studs protruding from the existing foundation.

19. A baggage handling unit according to claim 18, wherein the plurality of holes farmed through the mounting plate is for receiving the plurality of studs protruding from the existing foundation in an industry standard number 7 bolt pattern.

20. A baggage handling unit according to claim 14, comprising a controller for controlling the controllable baggage lift mechanism.

21. A baggage handling unit according to claim 14, wherein the walkway comprises a controllably moveable barrier for preventing persons or objects from falling through the access port of the walkway when the baggage enclosure is lowered to a lower station at a height that is elevationally below the access port of the walkway.

22. A baggage handling unit according to claim 21, wherein the controllably moveable barrier comprises a roll-down door.

23. A method of retrofitting an existing passenger boarding bridge having an existing foundation that is formed within a portion of the apron surface below the passenger boarding bridge, the existing foundation including a plurality of studs protruding therefrom, the method comprising;

provide a baggage handling unit including a support configured for engaging a mounting structure of the existing foundation, the mounting structure of existing foundation including the plurality of studs protruding therefrom, and the baggage handling unit including a mount configured for structurally coupling the baggage handling unit to a rotunda of the existing passenger boarding bridge;

displacing the existing passenger boarding bridge from the existing foundation;

mounting the baggage handling unit to the existing foundation via the support and the mounting structure of the existing foundation; and, structurally mounting the rotunda of the existing passenger boarding bridge to the baggage handling unit via the mount, such that the rotunda is supported at a position that is horizontally displaced from the existing foundation.

24. A method according to claim 23, wherein providing a baggage handling unit comprises providing a pre-assembled unit including a walkway, a baggage elevating element, the support, and the mount.

25. A method according to claim 23, comprising mounting a counter-weight to the baggage handling unit for counter-balancing an aircraft engaging portion of the existing passenger boarding bridge such that a moment imposed from the baggage handling unit to the existing foundation is at least partially compensated.

26. A method according to claim 23, wherein displacing the existing passenger boarding bridge comprises disengaging a rotunda column associated with the existing passenger boarding bridge from the mounting structure of the existing foundation.

* * * * *